Patented Dec. 8, 1936

2,063,837

UNITED STATES PATENT OFFICE 2,063,837

CONDENSATION PRODUCT AND PROCESS

Herman A. Bruson, Germantown, Pa., assignor to The Resinous Products & Chemical Co. Inc., Philadelphia, Pa.

No Drawing. Application March 20, 1933, Serial No. 661,790

11 Claims. (Cl. 260—8)

The present invention deals with resinous materials prepared from maleic anhydride or maleic acid, and terpenic alcohols, and has particular relation to a process for making new resinous materials by heating maleic anhydride or maleic acid with alpha-terpinol. This invention is a continuation-in-part of my copending patent application, Serial No. 610,504, filed May 10, 1932.

As described in the above copending application, alpha-terpineol reacts with maleic anhydride or maleic acid to yield resinous materials which may be further heated with castor oil to yield plastic masses suitable for use as plasticizers for nitrocellulose.

By leaving out the castor oil, however, resinous, plastic substances are obtained which are suitable for use as plasticizers not only for nitrocellulose but also for cellulose esters (cellulose acetate) and cellulose ethers.

According to the present invention, therefore maleic acid or maleic anhydride (or a mixture of both) is heated with alpha-terpineol at a temperature advantageously between about 140° and 250° C., the preferred range being 150° C.–200° C. The alpha-terpineol is preferably used in excess of equivalent molecular proportions, i. e. in excess of a ratio of 1 mole terpineol to 1 mole maleic anhydride; but molecular equivalent proportions can be used or even an excess of maleic anhydride can be employed. The materials are heated together either under reflux or in vessel having an air condenser, or automatic water separator so that the water which is split off can be continually removed as fast as formed. Heating is continued for about 5–12 hours depending upon the size of the batch, the speed with which the water is removed, and the temperature of the bath. When the reaction is complete, unchanged maleic acid or maleic anhydride, terpineol and other volatile products are removed by distillation preferably in vacuo or by first washing out the maleic acid with hot water and then distilling.

The residue which remains in the still up to a point where on distillation the vapors reach a temperature of about 130° C. at 3 m. m. pressure of mercury, is a pale yellow or reddish yellow, very viscous sirup. It is readily soluble in acetone, ethyl alcohol, ethyl acetate, and toluene. It is readily compatible with cellulose acetate in all proportions giving transparent flexible films when incorporated therein as a plasticizer. This viscous sirup can be made very pale in color by distillation in high vacuo. It boils over a range of 165–230° C. at 2–3 m. m. pressure of mercury and is then readily soluble in petroleum ether and carbon tetrachloride as well as the previously mentioned solvents. It is compatible not only with cellulose acetate or other cellulose esters but also with nitro-cellulose or cellulose ethers (benzyl cellulose), it being understood that the term "compatible" as used herein refers to the property of giving a clear film with the cellulose derivative when incorporated therewith as a plasticizer, as in a commercial lacquer.

For practical purposes it is not necessary to use chemically pure alpha-terpineol for the purpose of this invention, but the technical commercially available grade of alpha-terpineol containing varying small amounts of other someric terpineols (beta or gamma) as well as other impurities such as borneol, isoborneol, fenchol, pinene and so forth, can also be used with good results. Furthermore the alpha-terpineol may be replaced by an equivalent molecular amount of terpine or its hydrate known as "terpine hydrate", this material acting essentially as terpineol does in the above reaction, since it loses water to form terpineol.

The condensation products obtained according to the present invention can be heated with natural or other synthetic resins such as colophony, "ester gum" (rosin-glyceride), phenolic-formaldehyde resins, natural waxes, fatty glycerides of natural origin, and similar reactive bodies to form new condensation products having a variety of technical uses in coating compositions, and for laminating and insulating purposes. Furthermore the herein described condensation products may be used to plasticize certain non-reactive phenolic-aldehyde resins of the so-called "Novolack" type, as well as the reactive type molding powders made from formaldehyde and phenols by admixing therewith.

As illustrating this invention the following examples are given, the parts being by weight.

Example 1

33 parts of maleic anhydride are mixed with 65 parts of alpha-terpineol and the mixture heated 6–7 hours under reflux on an oil bath at 180–185° C. The mixture is then distilled in vacuo (3 m. m.) until the vapor temperature reaches 180° C., whereby water, terpineol, maleic anhydride, and other volatile impurities are removed. The still residue consists of a pale, yellow, resinous mass.

A clear lacquer was made from this resin according to the following formula:

| | Parts |
|---|---|
| Medium viscosity cellulose acetate | 5 |
| Ethyl acetate | 65 |
| Ethyl lactate | 30 |
| Above resin | 7.5 |

The film obtained from the above lacquer was clear, tough, and adherent.

A solution of 20 parts phenol-formaldehyde resin of the "Novolack" type in 30 parts of alcohol was mixed with 20 parts of maleic-terpineol resin. The film obtained on evaporation was a tough, elastic film whereas the Novolack film itself (without the maleic-terpineol resin) is hard and brittle.

100 parts of colophony were heated at 220° C. with 100 parts of maleic-terpineol resin for 3 hours. The product obtained was a tough plastic resin useful in preparing oleoresinous varnishes.

*Example 2*

A mixture of 32.7 parts maleic anhydride and 77 parts alpha-terpineol was heated under reflux in such a manner that the water formed by the reaction was continuously removed as fast as formed, by means of the well-known automatic water separator. The temperature was raised slowly to 140° C. and kept thereat for several hours until violent boiling ceased, then the temperature was raised to 230° C. during 3-4 hours. At the end of this time a clear, pale golden yellow oil was obtained. This material was distilled in vacuo, and the fraction boiling at 165-200° C./1-3 m.m. collected. It formed an almost colorless viscous oil, insoluble in water, but readily soluble in petroleum ether, toluol, carbon tetrachloride, 95% ethanol, acetone, ethylene glycol monoethyl ether and ethyl acetate. It could be mixed in any proportions with cellulose acetate, cellulose nitrate, or benzyl cellulose in ethyl acetate solution or mixtures of ethyl acetate and other organic solvents as used in preparing cellulosic lacquers.

In the above example, the maleic anhydride can be replaced by a molecular equivalent quantity of maleic acid and the same results obtained. The reaction may be carried out in the presence of an inert organic solvent such as xylene, acetylene tetrachloride, ortho-dichlorobenzene or a large excess of terpineol and the like, to help carry off the water formed and to lessen the vigor of the reaction.

Traces of unchanged maleic acid or maleic anhydride can be removed from the crude product before vacuum distillation by washing with warm water, if desired.

The reaction can be carried out also under reduced or superatmospheric pressure.

*Example 3*

A mixture of 32.7 parts maleic anhydride, 71.5 parts alpha-terpineol (90% purity) and 100 grams xylene was boiled under reflux for 6½ hours. The xylene solution obtained was then thoroughly washed with hot water and the aqueous layer separated from the xylene layer. Upon distilling the latter first at atmospheric pressure to recover the xylene and finally in vacuo, a pale viscous oil boiling principally at 175-195° C./2 m.m. was obtained. It was readily soluble in petroleum ether, alcohol, toluene, and carbon tetrachloride and was compatible in all proportions with cellulose acetate acting therein as a plasticizer.

I am aware that terpenes have been heated with phthalic anhydride and polyhydric alcohols such as glycerol to give so-called "alkyd" resins. In such bodies the terpene is combined with the polybasic acid in the form of a mixed ester with the polyhydric alcohol. In the present invention however, no polyhydric alcohol whatsoever is employed, the terpineol being combined directly with maleic anhydride in the form of a complex body which is not an ester but an additive product resulting from the mutual saturation of the double bonds of the two interacting components.

It is to be understood that the above examples are merely illustrative and are in no way to confine the invention. Lower or higher temperatures may be employed and superatmospheric or subatmospheric pressures. The scope of the invention is limited only by the following claims.

What I claim is:

1. The process of making a resin which is compatible with cellulose acetate, which consists in heating at reaction temperature a mixture of reacting proportions of alpha-terpineol and a member of the group consisting of maleic anhydride and maleic acid; and removing the water and volatile impurities from the reaction product.

2. The process of making a resin which consists in heating at reaction temperature a mixture of reacting proportions of alpha-terpineol and a member of the group consisting of maleic anhydride and maleic acid, and, after condensation is complete, distilling off the volatile impurities from the reaction product.

3. The process of making a resin composition which consists in heating at reaction temperature in an inert volatile solvent, a mixture of reacting proportions of alpha-terpineol and a member of the group consisting of maleic anhydride and maleic acid, and removing the water formed from the reaction.

4. The process of making a resin which consists in heating a member of the group consisting of maleic anhydride and maleic acid with an excess of alpha-terpineol at about 140°-250° C. and subsequently removing the volatile impurities from the reaction product.

5. The process of making a resin which consists in heating at reaction temperature maleic anhydride with a slight excess of alpha-terpineol, continuously removing the water as fast as formed, and when reaction is complete, distilling off any volatile impurities.

6. The reaction product of maleic anhydride with alpha-terpineol, free of moisture, volatile impurities, and crystalline material.

7. A composition of matter consisting of the reaction product of (1) alpha-terpineol and maleic acid, with (2) colophony.

8. The process which consists in heating reacting proportions of alpha-terpineol and maleic anhydride at a temperature of combination of the components and subsequently distilling the reaction product in vacuo, to isolate a fraction boiling substantially at 165-200° C./1-3 m.m.

9. In the process as described in claim 1, the step which comprises washing out unchanged maleic acid and maleic anhydride with water prior to distillation.

10. The condensation product of alpha terpineol and a member of the group consisting of maleic anhydride and maleic acid.

11. As a new composition of matter, the reaction product of maleic anhydride and a terpene alcohol containing a tertiary hydroxyl group.

HERMAN A. BRUSON.